United States Patent [19]

Flowers et al.

[11] Patent Number: 4,926,335

[45] Date of Patent: May 15, 1990

[54] DETERMINING BAROMETRIC PRESSURE USING A MANIFOLD PRESSURE SENSOR

[75] Inventors: Barbara A. Flowers, Canton; Richard A. Marsh, Birmingham; John C. Haraf, Livonia; Alfred D. LePage, Plymouth, all of Mich.

[73] Assignee: General Motors Corporation, Detroit, Mich.

[21] Appl. No.: 224,090

[22] Filed: Jul. 25, 1988

[51] Int. Cl.[5] .................... F02D 41/30; G06F 15/20

[52] U.S. Cl. .................... 364/431.05; 364/431.04; 123/494; 123/463; 123/412; 73/118.2

[58] Field of Search .................... 364/431.03, 431.05, 364/558, 431.08, 431.04; 73/118.2, 198, 114, 117.3; 123/412, 465, 463, 416, 494

[56] References Cited

U.S. PATENT DOCUMENTS

| | | | |
|---|---|---|---|
| 4,271,797 | 6/1981 | McCarbery | 123/412 |
| 4,385,606 | 5/1983 | Hattori et al. | 123/416 |
| 4,446,523 | 5/1984 | Reinke | 364/431.05 |
| 4,590,563 | 5/1986 | Matsumura et al. | 364/431.05 |
| 4,600,993 | 7/1986 | Pauwels et al. | 364/431.05 |
| 4,714,067 | 12/1987 | Staerzl | 123/412 |
| 4,787,043 | 11/1988 | Zimmerman et al. | 364/431.05 |

FOREIGN PATENT DOCUMENTS

| | | | |
|---|---|---|---|
| 0253948 | 12/1985 | Japan | 364/431.05 |

*Primary Examiner*—Parshotam S. Lall
*Assistant Examiner*—V. Trans
*Attorney, Agent, or Firm*—Howard N. Conkey

[57] ABSTRACT

A method for determining barometric pressure uses a manifold pressure sensor for measuring the manifold absolute pressure. A pressure drop between the atmosphere and the intake manifold is determined by utilizing stored lookup tables based on measured values of throttle angle and engine speed. Barometric pressure is then determined by summing the manifold absolute pressure and the pressure drop.

2 Claims, 4 Drawing Sheets

DETERMINING BAROMETRIC PRESSURE USING A MANIFOLD PRESSURE SENSOR

BACKGROUND OF THE INVENTION

This invention relates to engine control systems in general and more particularly to determining barometric pressure using a manifold pressure sensor in an engine control system for an internal combustion engine.

Barometric pressure, the force per unit area due to the weight of the atmosphere, can be measured in a variety of ways. Currently, in automotive applications, the barometric pressure can be measured using a barometric pressure sensor mountable on any suitable place on the vehicle where it sees true atmospheric pressure. Such a sensor generates an output signal indicative of the atmospheric pressure. The barometric pressure reading is then used for a number of automobile controls. For example, barometric pressure is used for fuel management, exhaust gas recirculation, spark timing, shift control, idle speed compensation and coast-down throttle angles. However, barometric pressure sensors can be costly and it is always desirable, particularly in automotive applications, to minimize costs.

It is well known in automotive engine control systems to measure the manifold absolute pressure (MAP) using a MAP sensor. The manifold absolute pressure value is measured in automobiles because it is necessary for fuel delivery accuracy. The MAP supplies information on how much air is ingested during each cylinder intake stroke and this information is then used in base fuel calculations to determine how much fuel is needed for each cylinder.

It is also well known in the industry that at certain engine conditions such as wide open throttle (WOT), when the engine is keyed on and when the ignition is off, MAP is substantially equal to barometric pressure. Some prior systems have used this fact to determine barometric pressure at those particular engine conditions by using the manifold absolute pressure sensor rather than a separate barometric pressure sensor. However, these systems are ineffective for updating barometric pressure under certain vehicle operating conditions such as a long uphill climb. It would be desirable, then, to devise a method for using the manifold absolute pressure sensor to determine barometric pressure at all other engine conditions, including part throttle.

SUMMARY OF THE INVENTION

This invention provides for a determination of the barometric pressure at throttle positions in addition to WOT conditions using a manifold pressure sensor. This is cost efficient in automotive applications because manifold pressure is already measured for fuel delivery purposes.

In general, the subject invention provides a way to measure the barometric pressure based on the manifold absolute pressure even at part throttle conditions. This is accomplished by predicting the pressure offset between barometric pressure and manifold absolute pressure based on engine speed and throttle angle and then adding the offset value to MAP, the offset being the pressure drop in the intake system between atmosphere and the intake manifold. In the preferred embodiment of this invention, an accurate prediction of the offset value is obtained by interpolating between pressure offset values across the intake induction system between atmosphere and intake manifold, these offset values being calibrated at high altitude and at sea level. These pressure drop values are contained in lookup tables as functions of engine speed and throttle angle. The pressure drop value corresponding to measured values of engine speed and throttle angle can be added to the manifold absolute pressure to obtain a barometric pressure.

The foregoing and other objects of this invention may be best understood by reference to the following description of a preferred embodiment and the drawings in which.

DESCRIPTION OF THE PREFERRED EMBODIMENT

Figure 1:
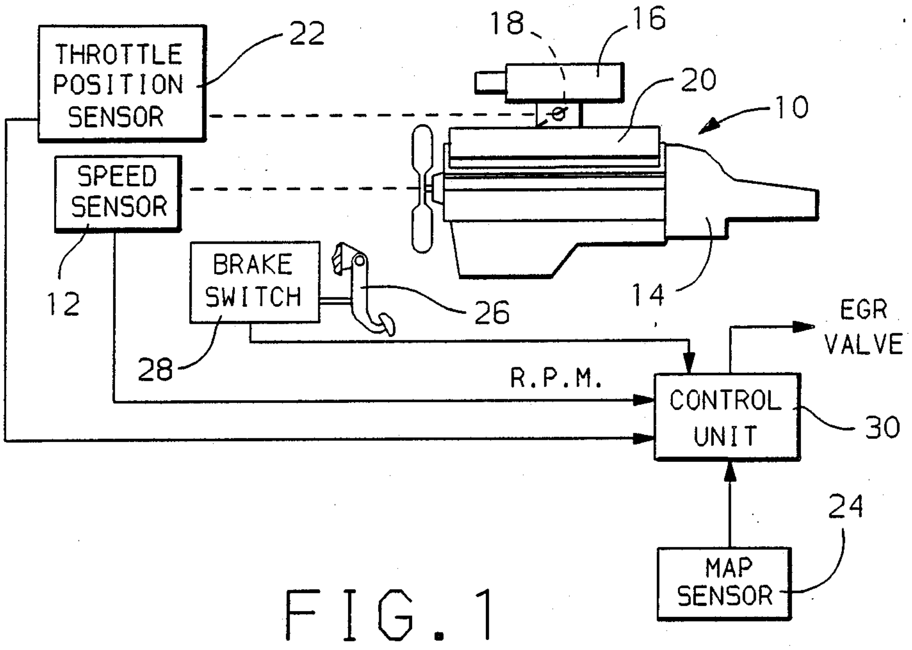
FIG. 1 is a schematic and block diagram of an embodiment of this invention with a vehicle engine.

Referring to FIG. 1, a motor vehicle engine 10 is shown, mountable in a motor vehicle in the normal manner, although the vehicle itself is omitted from the Figure. Engine 10 is of the internal combustion type having a rotating crankshaft, the rotations of which are sensed by a speed sensor 12. Speed sensor 12 may be any appropriate sensor of the type adapted to generate the signal indicative of the rotational speed of the crankshaft. An example of such a sensor is a magnetic pickup adjacent to the toothed flywheel of engine 10 coupled to a counter which counts pulses for unit time and supplies such counts on a regular basis. The output of the rotating crankshaft drives the transmission 14.

Engine 10 is also supplied with an air delivery system of the type wherein the intake air flows from the atmosphere at barometric pressure through an air filter 16 and past a throttle plate 18 which controls the regulation and flow of air into the intake manifold 20 from where it is supplied to the individual cylinders. Fuel can be delivered to a cylinder by any conventional means such as a fuel injection system, including fuel injectors for injecting fuel into the intake manifold 20.

Throttle actuation apparatus for carburetor 14 may be a standard accelerator pedal as included in most motor vehicles. Throttle position sensor 22 is adapted to determine what position throttle plate 18 is in. Such throttle position sensors are well known in control systems generally. Throttle position sensor 22 may be any appropriate sensor such as a potentiometer for providing a variable voltage or a voltage divider for generating a voltage representative of the position of the throttle.

Also associated with intake manifold 20 is a pressure sensor 24 for measuring manifold absolute pressure (MAP). MAP sensor 24 generates a signal indicative of the absolute pressure within the intake manifold 20 downstream of the throttle plate 18. The MAP signal can then be used in base fuel calculations to determine the correct amount of fuel to be supplied to each cylinder.

The vehicle powered by engine 10 includes an operator actuated braking system having a standard brake pedal 26 which, when pressed to actuate the brake, also actuates a brake switch 28 of the type normally used to illuminate the brake lights. Brake switch 28 therefor generates an output to indicate when the vehicle brakes are being applied.

The system further includes a control unit 30 adapted to receive inputs from the various switches and sensors described above, to control various engine functions such as fuel, spark ignition and EGR and to determine barometric pressure in accordance with the principles of this invention. It is understood that additional sensors or indicators and other control functions may be included in this system.

Figure 2:
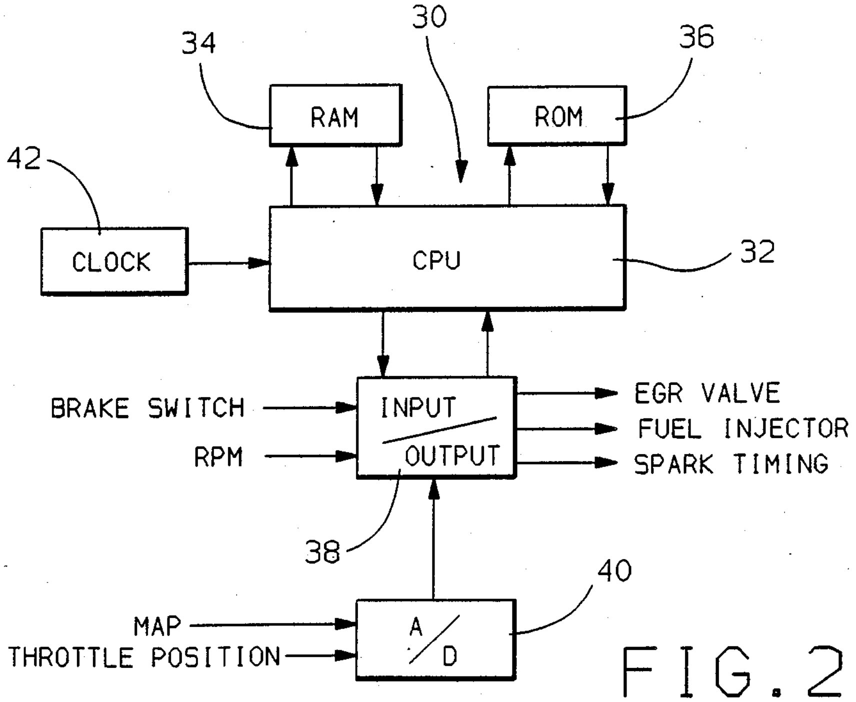
FIG. 2 illustrates a vehicle mounted computer which is a preferred embodiment of the control unit shown in FIG. 1.

The preferred embodiment of the control unit 30 is a vehicle mounted digital computer which accepts the various input signals and processes them according to a predetermined program. Referring to FIG. 2, the digital computer basically comprises a central processing unit (CPU) 32 which interfaces in the normal manner with a random access memory (RAM) 34, a read only memory (ROM) 36, an input/output unit (I/0) 38, an analog-to-digital converter (A/D) 40, and a clock 42.

In general, the CPU 32 executes an operating program permanently stored in the ROM 36 which also contains stored lookup tables in accordance with the values of selected parameters as will be described. The RAM 34 provides a convenient memory into which data may be temporarily stored and from which data may be read at various address locations determined in accordance with the operating program stored in the ROM 36.

In the operation of the digital computer of FIG. 2, certain discrete input switches and signals such as the brake switch 28 and the engine speed signal from speed sensor 12 have binary output and so may be input directly to the input/output unit 38. Other signals such as the manifold absolute pressure (MAP) signal from the MAP sensor 24 and the throttle position signal from the throttle position sensor 22 are analog in nature and therefore are input to the A/D converter 40 to be converted to a digital signal before being input to the I/0 unit 38. The I/0 unit 38 outputs control signals for controlling exhaust gas recirculation (EGR), fuel injection, and spark timing.

Figure 3A:
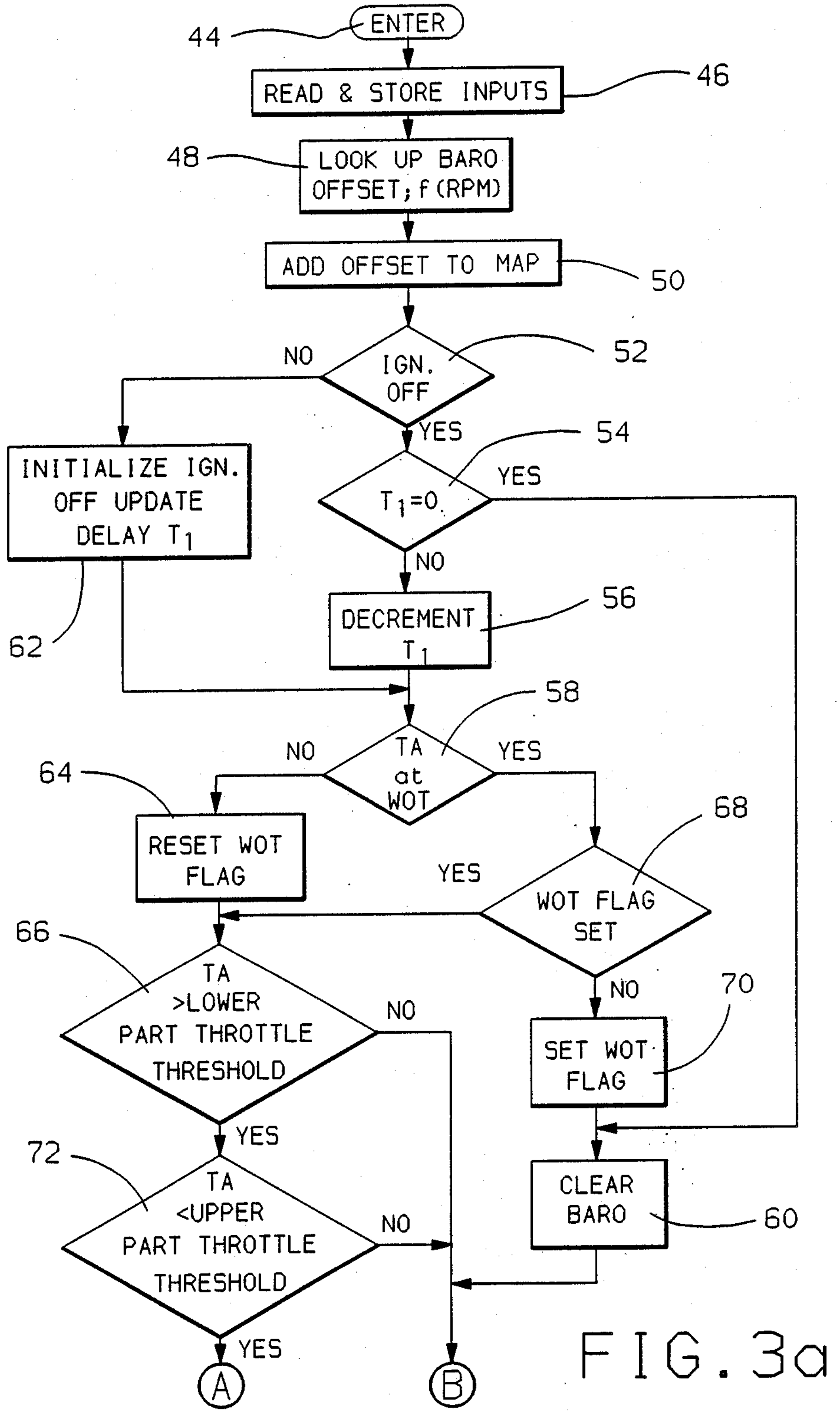
FIGS. 3A–3C are flow charts for the control unit of FIG. 1 which is suitable for use in the computer shown in FIG. 2.
Figure 3B:
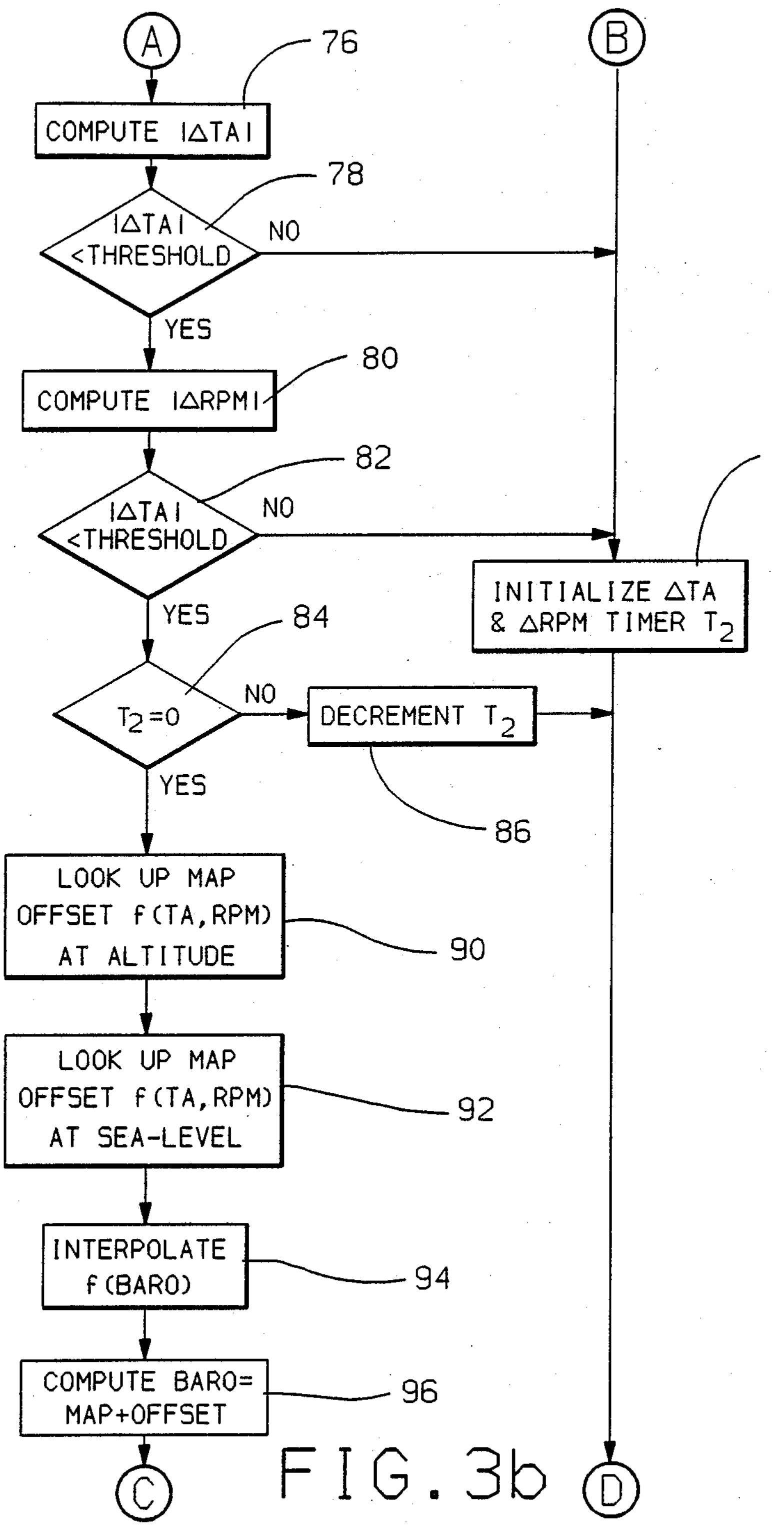
Figure 3C:
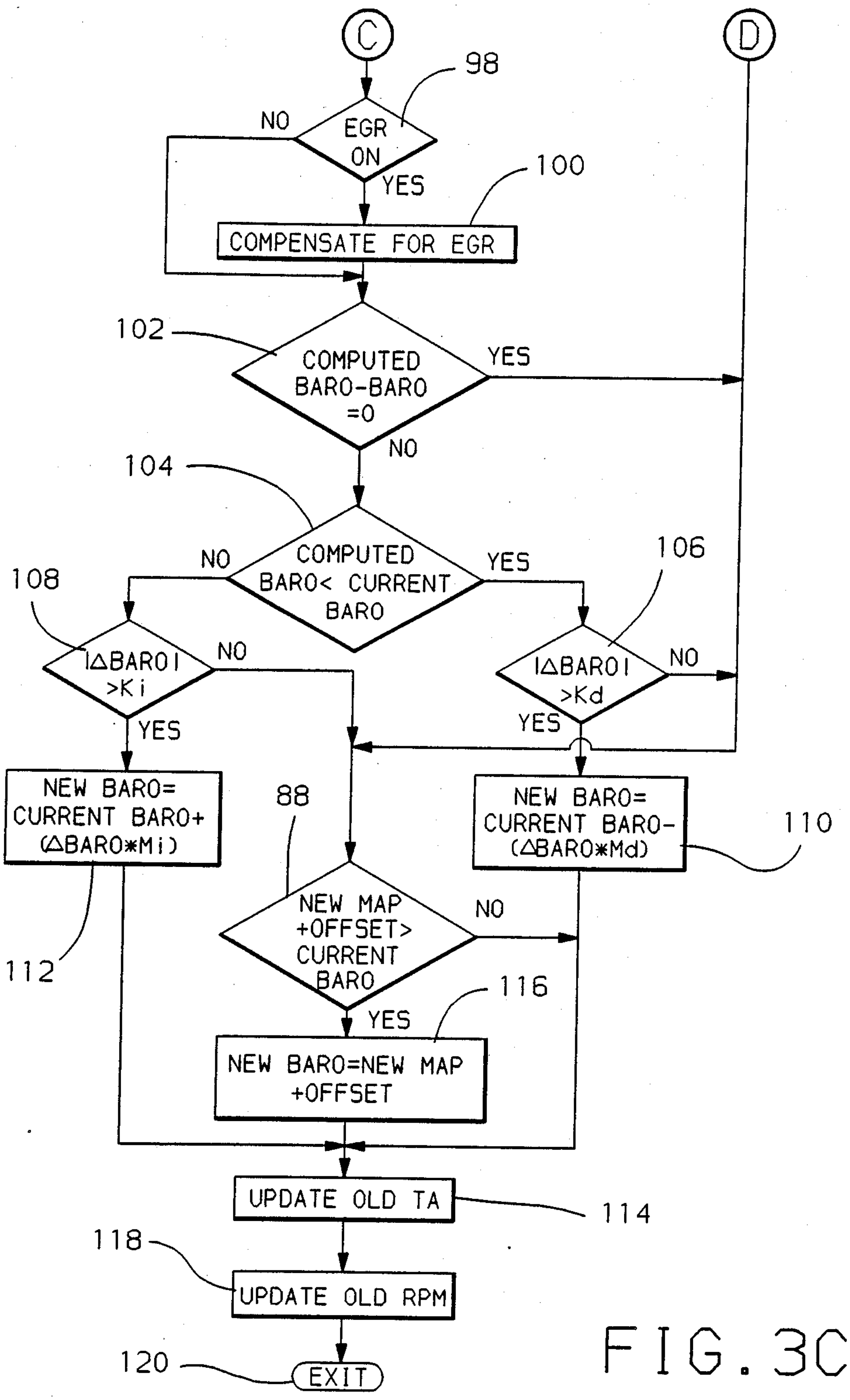

The digital control unit 30 depicted in FIG. 2 may be any of a variety of suitable units programmable by anyone of ordinary skill in the art, according to the flow chart of FIG. 3.

Although the barometric pressure update program of FIG. 3 may be executed at any interval, in the preferred embodiment the barometric pressure update program is executed every 300 milliseconds.

Referring to FIG. 3, the barometric pressure update program is entered at step 44 and proceeds to step 46 where the throttle angle and engine speed values are read and stored in ROM designated memory locations in the RAM 34. The program continues to step 48 where a pressure drop between the atmosphere and the intake manifold, also termed an offset value, is obtained from a lookup table in the ROM 36 and is a function of the air flow rate, or engine speed. From step 48, the program proceeds to step 50 where the pressure drop through the intake system, comprising a pressure offset value obtained at step 48, is added to the MAP value. The value resulting from step 50 is used later in the program and is representative of the barometric pressure when the vehicle is operating at wide open throttle (WOT) or when the vehicle is off.

Thereafter, the program proceeds to a decision block 52 where the condition of the ignition switch is determined. If the ignition is OFF, the program proceeds to decision block 54 to determine whether a specified stabilization time or delay has occurred. When T1 is equal to zero that indicates that the required delay has expired, at which time the program proceeds to step 60 where a barometric pressure update is forced by clearing the memory location containing the current barometric pressure value. The purpose of step 60 is to force an update when the ignition has been turned off for a specified period of time because under that condition it is known that barometric pressure is equal to manifold absolute pressure, irregardless of the throttle angle, since there is little or no air flow. If the delay has not expired, T1 is decremented at step 56 with each execution of the barometric pressure update program until T1 is zero, thereby assuring that engine conditions have stabilized and barometric pressure can be updated.

Returning to decision block 52, if the ignition is ON, step 62 is executed to set the ignition off update delay T1 to a predetermined initial value before the program proceeds to decision block 58.

In decision block 58, it is determined whether the throttle 18 is in a wide open throttle (WOT) position. If the throttle 18 is wide open, the throttle position is irrelevant and barometric pressure is represented by the result of step 50. For wide open throttle condition, then, the program proceeds to decision block 68 to determine if the WOT flag has been set. If the WOT flag is not set that indicates that the engine was not operating at WOT during the previous execution of the program in which case the program is conditioned to force a barometric pressure update by clearing the old barometric pressure value at step 60. The effect then is to execute the steps subsequent to step 70 only in the first instance of WOT operation. If the throttle angle is not wide open, the program proceeds to step 64 where the wide open throttle flag is reset before the program proceeds to decision block 66.

In order to update the barometric pressure at part throttle conditions, three conditions must be met. First, the throttle angle must be within a calibratable part throttle window as determined by upper and lower throttle angle thresholds. The preferred embodiment of this invention operates within this window to obtain the most reliable barometric pressure values possible. If the throttle angle is high it approaches WOT in which case the WOT barometric pressure update is a more accurate update. If the throttle angle is quite low, a barometric pressure update would be unreliable and, thus, an update would be undesirable. The second and third conditions that must be satisfied before a part throttle barometric pressure update occurs relate to steady state engine operating conditions. The second condition requires the throttle angle to be substantially steady state while the third condition requires the engine speed to be substantially steady state. The purpose of requiring these three conditions is to obtain an accurate measurement of barometric pressure at part throttle conditions.

From step 64 or from decision block 68, if it is determined that the wide open throttle flag has been set, the program proceeds to decision blocks 66 and 72 to determine if the throttle angle is within a part throttle threshold window. In the preferred embodiment of this invention, part throttle updates of barometric pressure are allowed only when the part throttle value is within a given range so the computations derived from the part throttle update do not exceed the calibration range of the lookup tables.

If the throttle angle is within the calibratable part throttle range, as determined at decision blocks 66 and 72, the program proceeds to steps 76 through 86 to determine if the throttle angle and engine speed are substantially steady state. Steady state operation is indicated if the change in throttle angle and engine speed are each less than respective values for a predetermined time period (the initial value of timer T2 established at step 74).

Steps 78 and 80 first determine if the change in the throttle angle (the absolute value of the difference between the old and new values of throttle angle) is less than a predetermined threshold value. If not, the timer T2 is reinitialized at step 74. If the change is less than the predetermined threshold, steps 82 and 84 determine if the change in the engine speed (the absolute value of the difference between the old and new values of engine speed) is less than a predetermined threshold value. If not, the timer T2 is reinitialized at step 74.

If the changes in throttle angle and engine speed are both less than their respective thresholds, steps 84 and 86 determine if the condition has existed for the time period established by step 74. If step 74 determines the time period has not expired, the required steady state conditions of the throttle angle and engine speed have not been met and the time is decremented at step 86.

If the step 84 determines that the required steady state conditions are met, the program next proceeds to determine the barometric pressure. This procedure begins at step 90 where the manifold absolute pressure offset value at altitude is obtained from a three-dimensional lookup table in the ROM 36 containing a MAP offset schedule as a function of throttle angle and engine speed. Likewise, at step 92 a MAP offset value at sea level is obtained from a three-dimensional lookup table in the ROM 36, this offset value also a function of throttle angle and engine speed. Since the pressure offset between atmosphere and manifold absolute pressure changes depending on the atmosphere, use of the two lookup tables containing manifold absolute pressure values at the extremes provides a way of compensating for changes in altitude. At step 94 a linear interpolation is performed between the two offsets as a function of the current stored value of barometric pressure. Because the MAP offset is dependent on barometric pressure, an interpolation based on the last estimated value of barometric pressure provides an accurate estimation of the new MAP offset. The result of this interpolation is the final part throttle MAP offset. In accordance with this invention, step 96 sums the new MAP offset and the measured intake manifold absolute pressure, thereby computing a measure of the barometric pressure to be used later in the program.

At decision block 98, it is determined whether the exhaust gas recirculation (EGR) is ON which would cause a manifold pressure variation. If the exhaust gas recirculation is ON, the program proceeds to step 100 where the EGR is subtracted from the interpolated value computed at step 94. Having accounted for any manifold pressure variation due to exhaust gas recirculation, the program proceeds to decision blocks 102 and 104 where one final test is made before enabling a part throttle update. At decision block 102 it is determined whether the subtraction of the last computed barometric pressure from the computed barometric pressure of step 96 is equal to zero. If this value is zero, the program proceeds to decision block 88. If not, the program proceeds to decision block 104 where the computed barometric pressure is compared with the current barometric pressure to determine if the computed barometric pressure of step 96 is decreasing or increasing.

If the pressure is decreasing, the amount of decrease is compared at step 106 with a pressure decreasing threshold Kd below which part throttle barometric pressure updating is prevented. If the decrease is greater than Kd, a new estimate of barometric pressure is computed at step 110 by the first order lag filter expression $$\text{new BARO} = \text{current BARO} - (\Delta\text{BARO} * \text{Md})$$

where Δ BARO is the difference between computed barometric pressure and current barometric pressure and Md is a decreasing pressure filter time constant having a value of unity or less. Similarly, if step 104 indicates pressure is increasing, the amount of increase is compared at step 108 with a pressure increasing threshold Ki above which part throttle barometric pressure updating is prevented. If the increase is less than Ki, a new estimate of barometric pressure is computed at step 112 by the expression $$\text{new BARO} = \text{current BARO} + (\Delta\text{BARO} * \text{Mi})$$

where Δ BARO is the difference between computed and current barometric pressure and Mi is an increasing pressure filter time constant having a value of unity or less.

Smoother updates result when using a low delta barometric pressure threshold at steps 106 and 108 and small values of Md and Mi since this allows the current barometric pressure to approach the computed barometric pressure in a few small increments rather than in one large step.

Returning to decision block 88, it is determined whether the sum of the new MAP plus the offset value obtained at step 50 is greater than the last used barometric pressure value. It will be recalled that current barometric pressure was cleared at step 60 if the wide open throttle or ignition off barometric pressure update conditions existed. The existence of either of these conditions forces the execution of step 116 via step 88 wherein the new barometric pressure is set equal to the value determined at step 50.

After step 114, where the old throttle angle value is updated with the new throttle angle value determined at step 46 and stored in the RAM 34, the program proceeds to step 118 where the old engine speed value is likewise updated before exiting at step 120.

The foregoing description of a preferred embodiment of the invention for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. For an engine having an intake manifold and an intake passage through which air is drawn from the atmosphere into the intake manifold, the intake passage including a throttle operable between wide open and closed angular positions to regulate the air flow through the intake passage into the intake manifold, a system for updating a determined barometric pressure value during part throttle angle conditions of the engine between first and second altitudes, the system comprising:

means for measuring the absolute pressure in the intake manifold;

means for measuring the angle of the throttle;

means for measuring the speed of the engine;

memory means including (A) a first lookup tabe storing predetermined pressure drop values between the atmosphere and the intake manifold at the first altitude as a function of throttle angle and engine speed and (B) a second lookup table storing predetermined pressure drop values between the atmosphere and the intake manifold at the second altitude as a function of throttle angle and engine speed; and means for updating the determined barometric pressure including (A) means for retrieving the stored pressure drop value from the first lookup table corresponding to the measured throttle angle and the measured engine speed, (B) means for retrieving the stored pressure drop value from the second lookup table corresponding to the measured throttle angle and the measured engine speed, (C) means for interpolating between the retrieved pressure drop values based on the determined barometric pressure value to provide an estimated pressure drop value between the atmosphere and the intake manifold and (D) means for summing the measured intake manifold absolute pressure and the estimated pressure drop value the summed value comprising a new determined value of the barometric pressure.

2. The system of claim 1 wherein the determined value of the barometric pressure is initialized to the sum of the measured absolute pressure of the intake manifold and an offset pressure that is a predetermined function of engine speed at predetermined engine operating conditions at which there is substantially no pressure drop across the throttle.

* * * * *